United States Patent [19]
McGregor et al.

[11] Patent Number: 6,138,004
[45] Date of Patent: Oct. 24, 2000

[54] SECURE INTERLINK RECEIVER FOR REMOTE PROGRAMMING OF WIRELESS TELEPHONES

[75] Inventors: Travis Melchin McGregor; Donald Scott McGregor, both of Danville; Theodore W. Watler, Long Beach, all of Calif.

[73] Assignee: Telemac Corporation, Los Angeles, Calif.

[21] Appl. No.: 08/968,329

[22] Filed: Nov. 12, 1997

Related U.S. Application Data

[63] Continuation of application No. 08/521,966, Aug. 31, 1995, abandoned.

[51] Int. Cl.[7] .................................... H04Q 7/20
[52] U.S. Cl. .................. 455/411; 455/418; 455/550; 455/557
[58] Field of Search .................. 455/403, 406, 455/407, 408, 410, 411, 418, 419, 550, 557, 558, 559, 564, 566; 380/23

[56] References Cited

U.S. PATENT DOCUMENTS

| | | |
|---|---|---|
| 4,518,824 | 5/1985 | Mondardini . |
| 4,706,275 | 11/1987 | Kamil . |
| 4,860,341 | 8/1989 | D'Avello . |
| 4,951,308 | 8/1990 | Bishop et al. . |
| 4,958,368 | 9/1990 | Parker . |
| 4,965,821 | 10/1990 | Bishop et al. . |
| 5,109,401 | 4/1992 | Hattori et al. . |
| 5,127,041 | 6/1992 | O'Sullivan . |
| 5,138,650 | 8/1992 | Stahl . |
| 5,144,649 | 9/1992 | Zicker . |
| 5,233,656 | 8/1993 | Langrand et al. ................ 380/32 |
| 5,276,729 | 1/1994 | Higuchi et al. ................ 455/564 |
| 5,297,191 | 3/1994 | Gersberg ................ 455/419 |
| 5,301,223 | 4/1994 | Amadon . |
| 5,303,297 | 4/1994 | Hillis . |
| 5,325,418 | 6/1994 | McGregor et al. ................ 455/408 |
| 5,335,278 | 8/1994 | Matchett . |
| 5,359,182 | 10/1994 | Schilling . |
| 5,386,455 | 1/1995 | Cooper ................ 455/419 |
| 5,465,288 | 11/1995 | Falvey et al. ................ 455/419 |
| 5,577,100 | 11/1996 | McGregor et al. ................ 455/418 |
| 5,625,669 | 4/1997 | McGregor et al. ................ 455/418 |
| 5,657,371 | 8/1997 | Suomi et al. ................ 455/418 |
| 5,815,732 | 9/1998 | Cooper et al. ................ 455/418 |
| 5,854,978 | 12/1998 | Heidari ................ 455/419 |
| 5,926,756 | 7/1999 | Piosenka et al. ................ 455/418 |

FOREIGN PATENT DOCUMENTS 9216078  9/1992  WIPO .

OTHER PUBLICATIONS

Nokia Service Manual, Nokia Mobile Phones, Inc. © 91 & 92.

Primary Examiner—Dwayne D. Bost
Assistant Examiner—Nay Maung
Attorney, Agent, or Firm—Richard Esty Peterson

[57] ABSTRACT

An interlink receiver system and receiver unit for remote encoding wireless phone units including a host computer that communicates with the interlink receiver unit over telephone lines or airways to encode wireless phone units with the key code for authentication of the phone unit and encryption of communications from the phone unit during use, the interlink receiver unit connecting to the host computer for data exchange and controlling the encoding of a connected phone unit.

28 Claims, 11 Drawing Sheets

SECURE INTERLINK RECEIVER FOR REMOTE PROGRAMMING OF WIRELESS TELEPHONES

This is a continuation of application Ser. No. 08/521,966 filed Aug. 31, 1995, now abandoned. This invention relates to a secure interlink receiver for programming wireless telephones wherein the interlink receiver interconnects a wireless telephone with a remote central processor for secure assignment of the necessary phone number and parameters for immediate use of the telephone by a customer with a designated service provider.

BACKGROUND OF THE INVENTION

The use of an interlink receiver for programming a telephone was first taught in McGregor, et al, U.S. Pat. No. 5,325,418, entitled, "Cellular Phone Accounting System", issued Jun. 28, 1995. In that patent, phones received from different manufacturers are programmed for use in a controlled environment. For example, in the situation where phones are programmed and activated for governmental use or organizational use in private companies, strict control over the programming procedure is maintained. Similarly, in the rental environment, the phones are programmed and tracked by the organization renting the phones enabling close operational control over the temporary use of the phone by a rental customer.

Although it was suggested that the procedures for programming, tracking and accounting described in the reference patent could be incorporated into central telephone systems, questions of security as well as inertia were predicted to inhibit broad application.

Additionally, where gang programming of multiple phones by manufacturers or service providers occurs, security can be controlled. A system for programming cellular phones in an interlink receiver with a gang platform is described in the continuation-in-part application of McGregor, et al, entitled, "Mobile Phone with Internal Call Accounting Controls," now U.S. Pat. No. 5,625,669, issued Apr. 29, 1997.

The significant problem of phone security is evident by the massive losses of carriers and service providers. The dramatic increase in wireless communication in the form of cellular telephone systems, cordless personal communication service devices, radio phones and other digital and analog systems that communicate over the airwaves has magnified the vulnerability to fraud. Frequency scanners and other interception devices have allowed access not only to the content of communications, but to the electronic serial numbers and access codes of the callers. Clone phones, that imitate a legitimate subscriber's phone, are fraudulently programmed to duplicate the codes of the legitimate phone and enable the user of the cloned phone to place calls that are billed to the authorized subscriber. Losses to wireless phone fraud are estimated to be in the hundreds of millions of dollars per year.

As wireless phone distribution moves from the controlled environment of carriers and local service providers to general retailers, the programming and activation of wireless phones is accomplished remotely. Frequently, several entities may be involved behind the transfer of a wireless phone from the retailer to the user. The retailer will likely sell wireless phones from different manufacturers, and offer assignment of the phone to different service providers. The retailer may have available different credit or debit plans for payment of the phone and carrying or underwriting the service provider charges, enabling a new market for intermediaries.

The availability of many of these options is described in the patent of McGregor, et al, U.S. Pat. No. 5,577,100, entitled, "Mobile Phone with Internal Accounting" issued Nov. 19, 1996. In that application, convenient methods of remote programming and phone activation are described, including methods that can be accomplished over the airways. With the advent of this prospect, the question of the security of the programming procedure becomes critical.

It is a primary object of this invention to resolve the problems of secure programming and activation of wireless phones where all or part of the programming originates from a host computer at a site remote from the phone being programmed. While the description of the invention is primarily directed to the use of the more secure line connection between the interlink receiver and the host computer to minimize unauthorized intrusion, the interlink receiver system is designed to communicate in encrypted messages to enable the dialog for remote programming to be accomplished via a wireless communication path. In certain areas of the world, the existing hardwire infrastructure is nonexistent or unreliable. Remote programming and activation over the airways is therefore a necessity.

The object of this invention is to provide a device and process that maximizes the ability to remotely program a wireless phone in a secure manner.

SUMMARY OF THE INVENTION

This invention relates to a device and process for secure remote programming of wireless phones.

Programming of phones from a remote host computer may be required for a number of reasons. In U.S. Pat. No. 5,325,418, a system for remotely programming wireless phones was described for the primary purpose of central accounting. Programming of cellular telephones in the rental environment includes initial programming and activation of new phones added to the rental inventory, and the reprogramming of rental phones that are returned to different rented sites and added to the return site inventory.

In other situations, programming of wireless phones from a remote host is desired to coordinate the allocation of assignable phone numbers. For example, the service provider may have a block of MIN's (mobile identification numbers) that must be assigned to new phones before they can be activated. If there is a number of distribution outlets, centralizing this resource allows assignment to be made in accordance with inventory movement at each site.

As programming and activation of the mobile phone moves away from the control of the manufacture, carrier or service provider, security becomes more difficult to implement. It has been suggested that remote programming can be performed with a conventional personal computer and a modem with the wireless phone directly connected to the serial port of the computer via a cable. Because a personal computer is effectively an open system, security is virtually impossible to implement, where security is to extend to the programmer. However, where there is interposed an interlink receiver between the host computer and the telephone unit as disclosed in the referenced patent, hardware and software can be implemented that effectively codes certain features of the programming sequence that is even secure from the technician programming the phone.

The interlink receiver of this invention is designed to include a secure encoding and encryption chip that permits certain security codes to be entered into a mobile phone without access by the programmer and without certain keys entering the communication dialogue between the host computer and the interlink receiver.

The interlink receiver of this invention is designed with an internal modem to allow the interlink receiver to directly connect to a phone line terminal for station to station connection with a remote host computer. The interlink receiver includes a small microprocessor and updatable memory to perform the procedural tasks of communicating with the host computer and the installed phone unit, and allowing data entry via a small keyboard and feedback with the technician, via a small display.

The secure interlink receiver has its own identification number and includes an internal routine for encrypting communications with the host computer. The interlink receiver is designed to enter a secret authentication key into the phone unit in a tamper-proof manner enabling the phone unit to generate shared secret data with the carrier or system provider. The authentication key or A-key is a 64 bit code assigned to the permanent security and identification memory of the mobile phone unit. The assigned code is known only to the home location register or authentication center, and does not change as the mobile unit roams from one zone to another. As detailed in the TIA/EIA Interim Standard 91 (IS-91), the necessary caller authorization codes and communication encryption codes are generated using in part the A-key. In this manner, each mobile phone unit has a unique key from which changing authentication and encryption codes can be derived. Enabling authentication codes and encryption codes to change for a discrete mobile phone unit greatly enhances the security of the unit. Additional procedures and protocols for secure call placement can be added, including random or calculated change of authentication codes and encryption codes.

The interlink receiver of this invention is designed to be an inexpensive, but secure device that can be used to remotely program and encode a mobile phone unit by a technician or a common sales person. The device is designed for use in a system with a host computer and includes the necessary terminal for interconnection with programmable mobile phone units of different manufacture.

These and other features will be apparent from a consideration of the detailed description of the preferred embodiments.

DETAILED DESCRIPTION OF THE PREFERRED EMBODIMENTS

Figure 1:
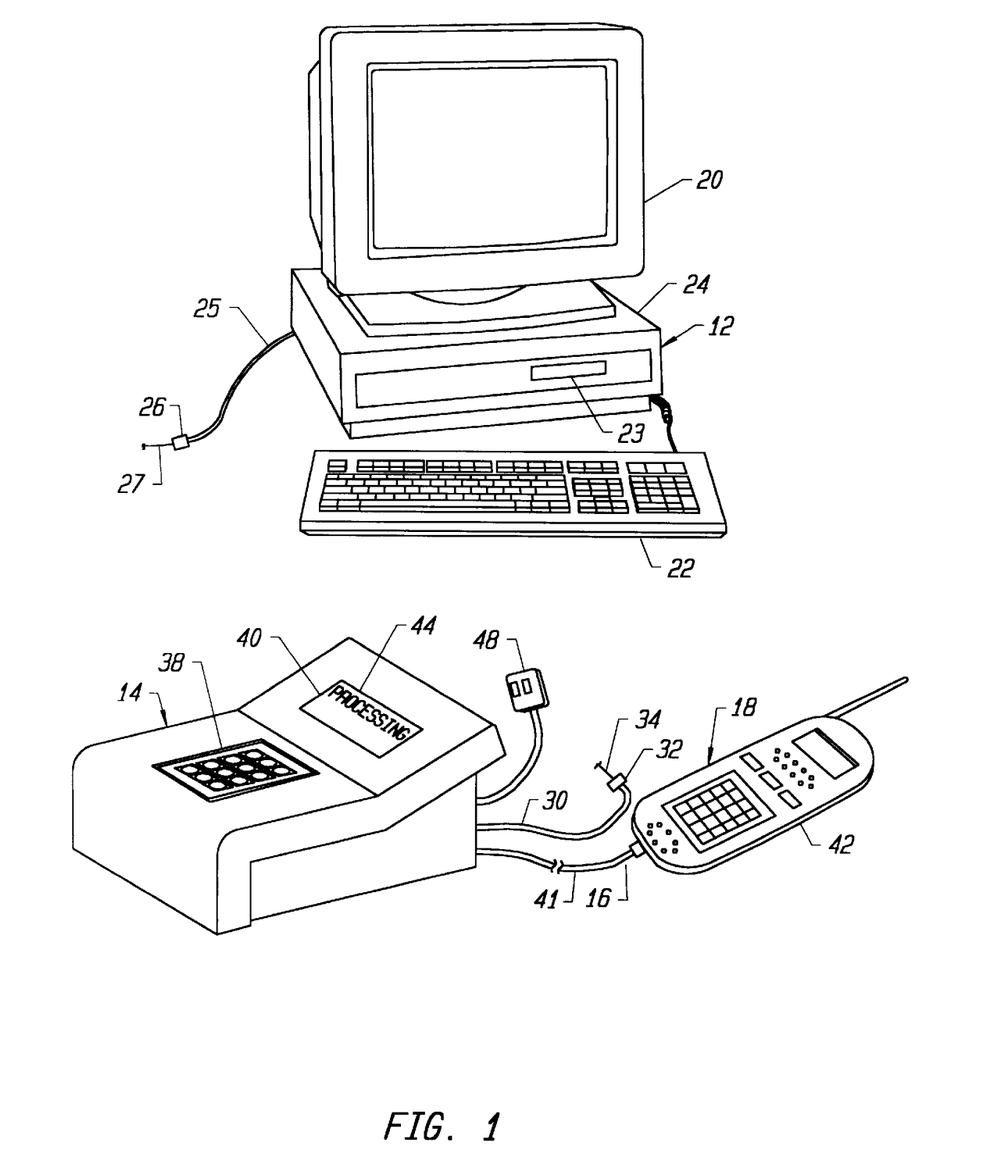
FIG. 1 is a perspective view of the interlink receiver system with a host computer, an interlink receiver unit and a terminal, with a phone unit connected to the terminal.

Referring to FIG. 1, the interlink receiver system is shown, and designated generally by the reference numeral 10. The system 10 includes a remote host computer 12, an interlink receiver unit 14 and an interconnection terminal 16. In operation, the interlink receiver system 10 connects to a programmable mobile phone unit 18, shown connected to the interconnection terminal 16 of the interlink receiver unit 14.

The host computer 12 is any type of computer or computer system server having at least the power of a conventional personal computer. In the example shown, the host computer 12 has a monitor 20, a keyboard 22 and a central processing unit 24. The host computer 12 includes a conventional internal modem 23 in the central processing unit 24, with a phone cord 25 and a terminal connector 26 connected to a conventional phone line 27.

Similarly, the interlink receiver unit 14 has an internal microprocessor and modem (not visible) with a phone cord 30 having a terminal connector 32 that connects to a conventional switched telephone line 34. During operation, the interlink receiver unit 14 is connected via modem to the host computer 12 through common carrier telephone lines. The interlink receiver unit 14 is fabricated with a secure housing 36, a touch-pad keyboard 38 and a small back-lit, LCD display screen 40.

In FIG. 1, the interlink receiver unit 14 is shown connected to the mobile phone unit 32, here a typical cellular telephone 42. The keyboard 38 and display screen 40 of the interlink receiver unit 14 are sufficient to display alphanumeric characters 44, enabling brief messages and codes to be conveyed to the party programming the phone unit 42. The interlink receiver unit 14 is designed to carry on a dialogue and data exchange with the host computer via modem and the technician or party programming the phone unit 42 via the display screen 40 and keyboard 38. The interlink receiver unit 14 communicates with the mobile phone unit 18 in the FIG. 1 embodiment via a cable 41 connected to a 25 pin DB-25 data port (not visible) at the back of the interlink receiver unit 14 and to the interconnection terminal 16 compatible with the mobile phone unit being programmed. Substitute cables having an interconnection terminal compatible with each manufacturer's phone unit are provided for programming phone units from different manufacturers. The interlink receiver unit 12 has a conventional power socket (not visible) for a power transformer cord unit 46 that connects to a customary power source for powering the interlink receiver unit 14 and a connected phone unit 18 at low d.c. voltage when power switch 48 is turned on. The interlink receiver unit 14 includes its own code kernel identical or similar to the A-key for authentication of the individual interlink receiver unit and for encrypted communication with the host computer.

Figure 3A:
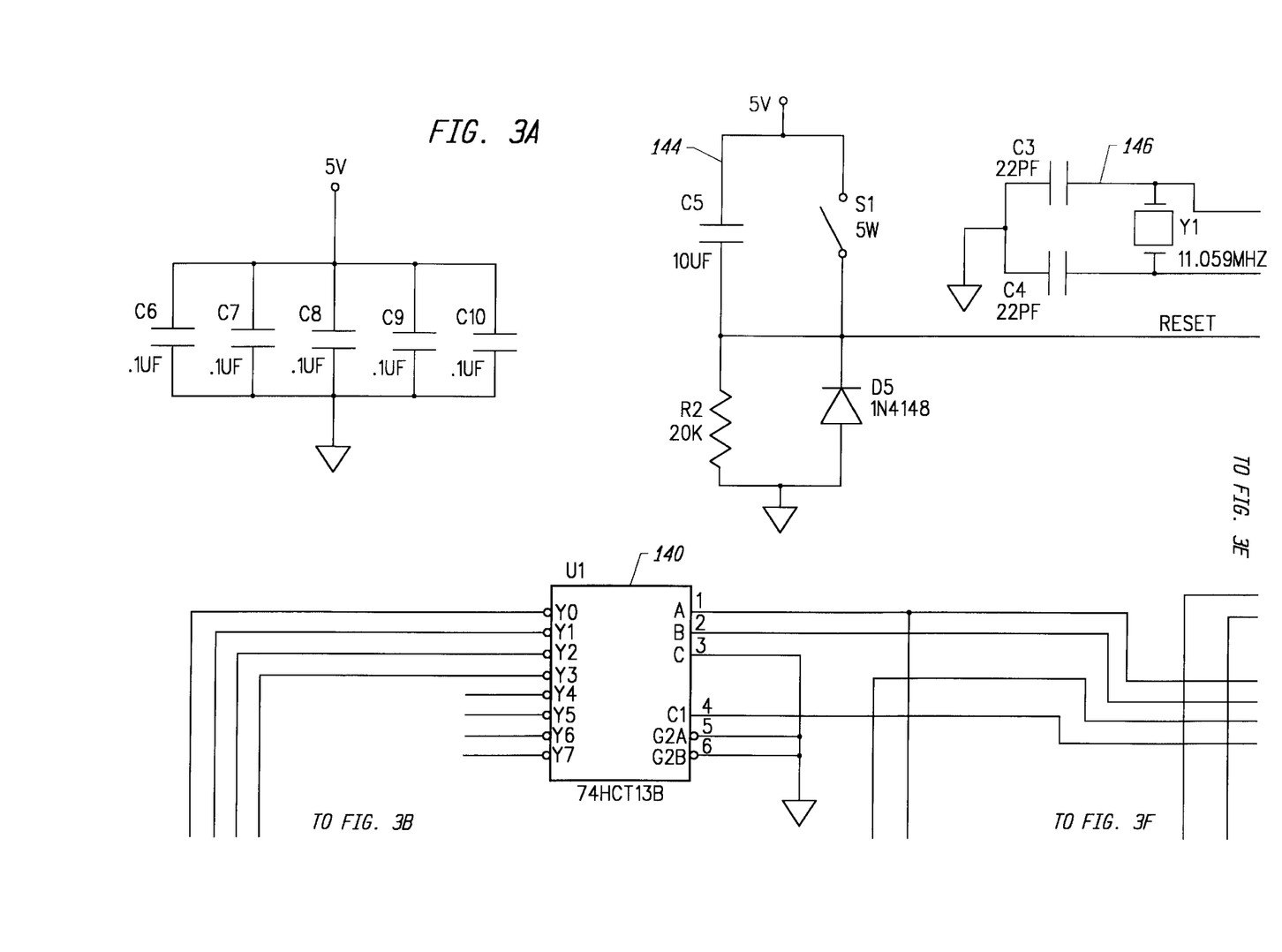
FIG. 3A is a first segment of a circuit diagram of the internal circuitry of the interlink receiver unit shown in FIG. 1.
Figure 3B:
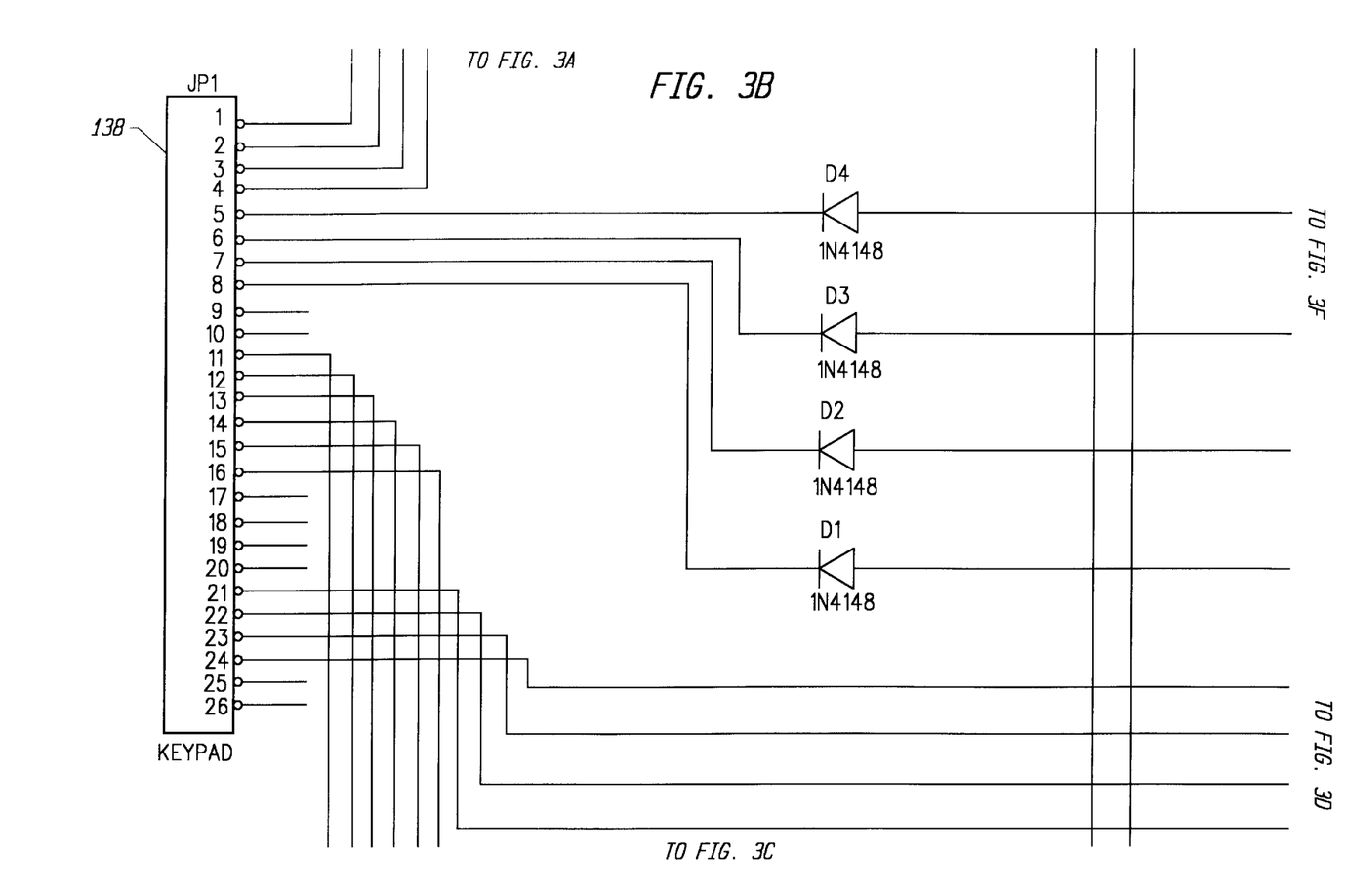
FIG. 3B is a second segment of the circuit diagram of FIG. 3A.
Figure 3C:
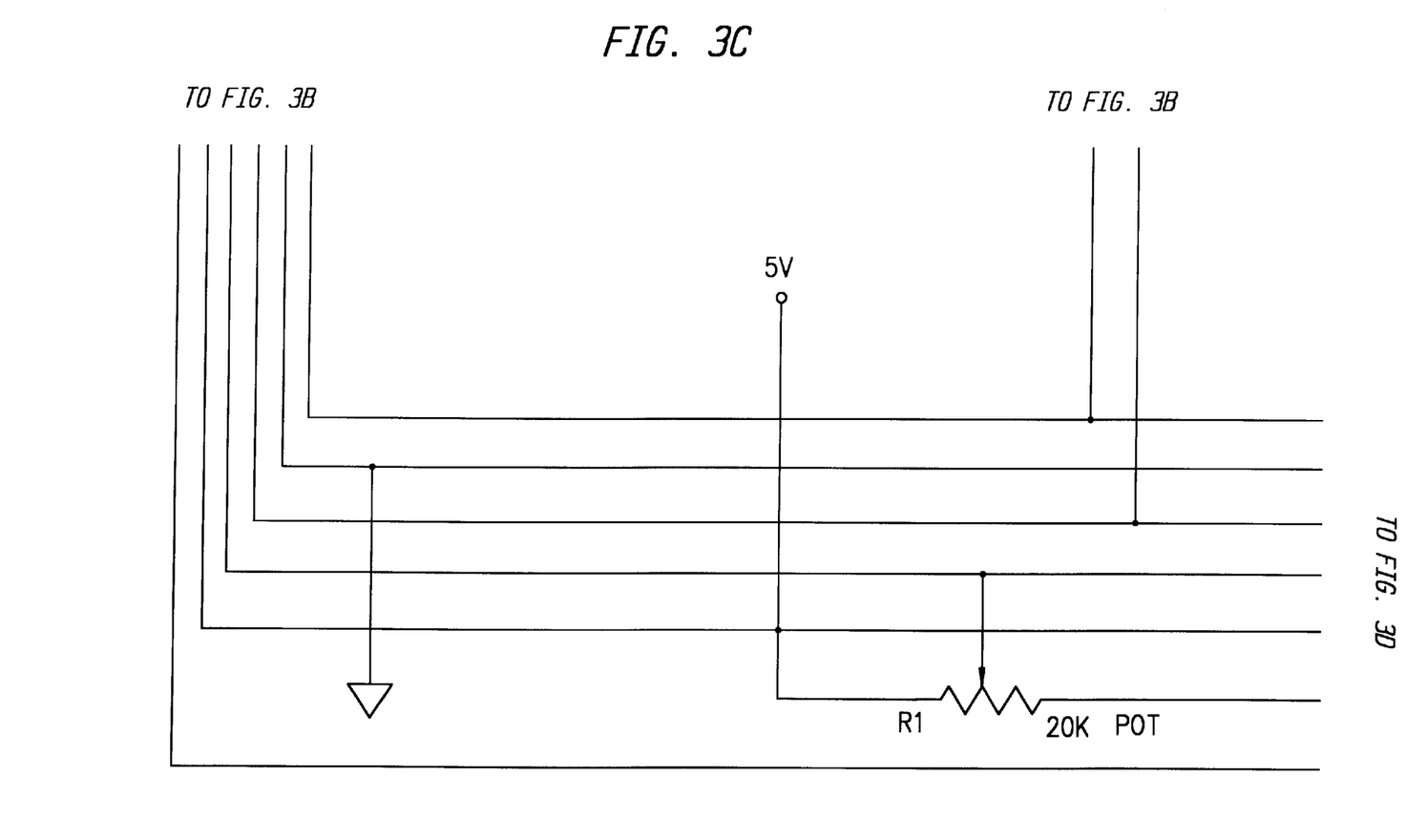
FIG. 3C is a third segment of the circuit diagram of FIG. 3A.
Figure 3D:
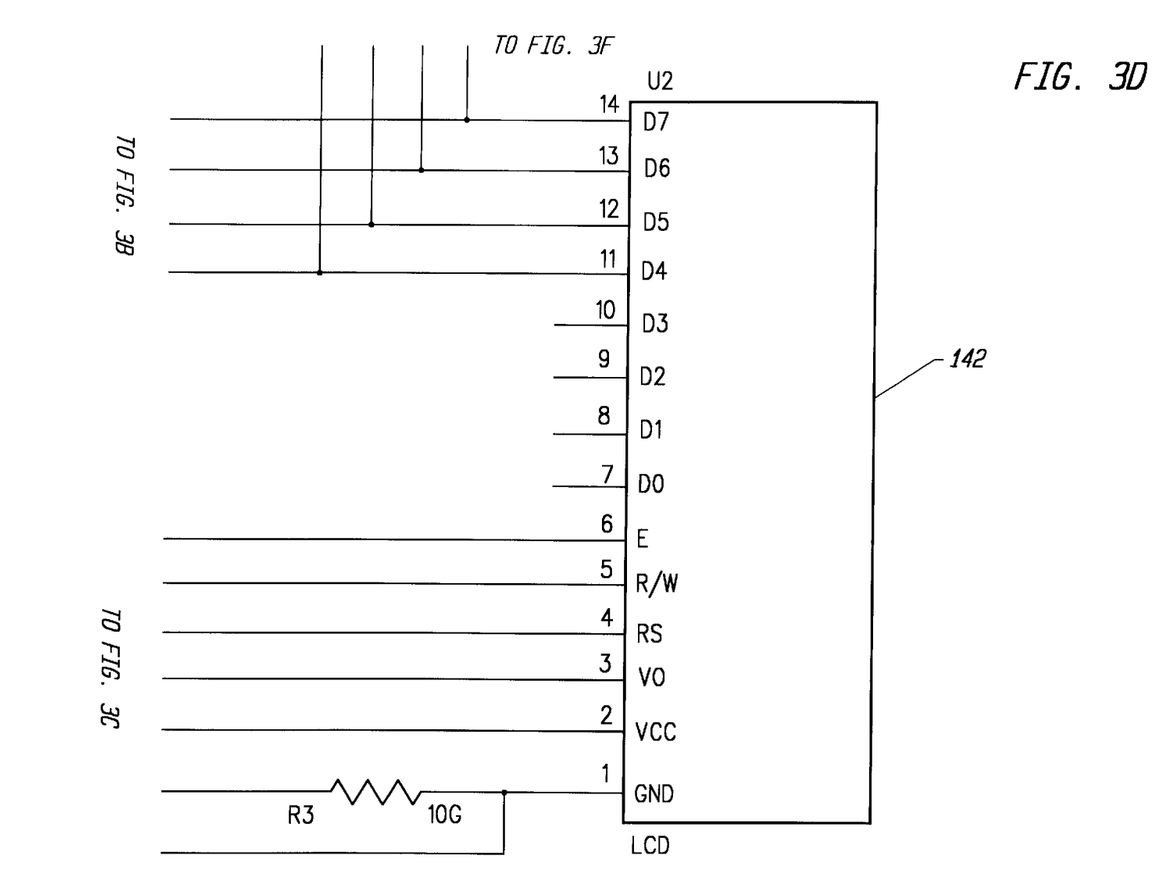
FIG. 3D is a fourth segment of the circuit diagram of FIG. 3A.
Figure 3E:
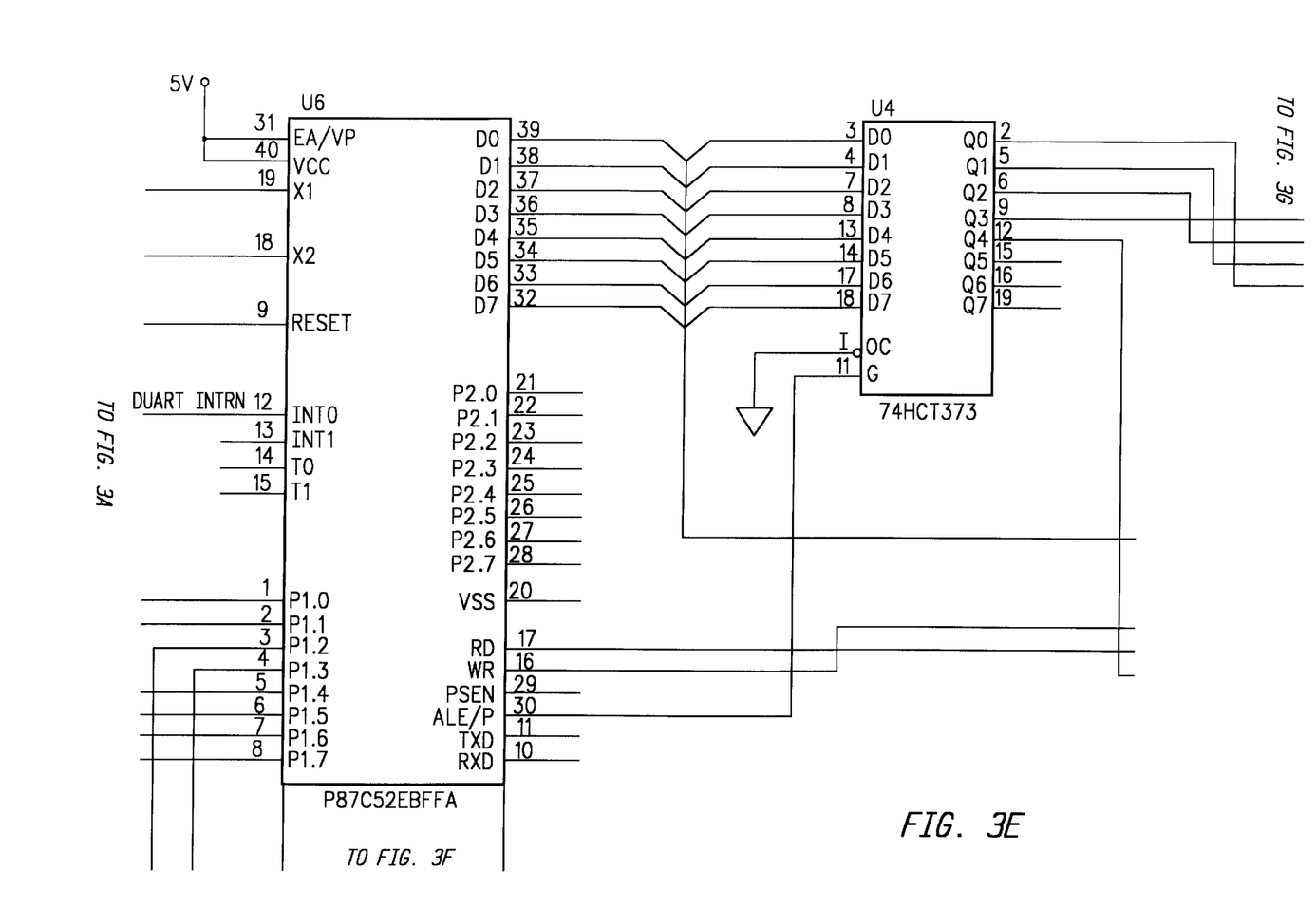
FIG. 3E is a fourth segment of the circuit diagram of FIG. 3A.
Figure 3F:
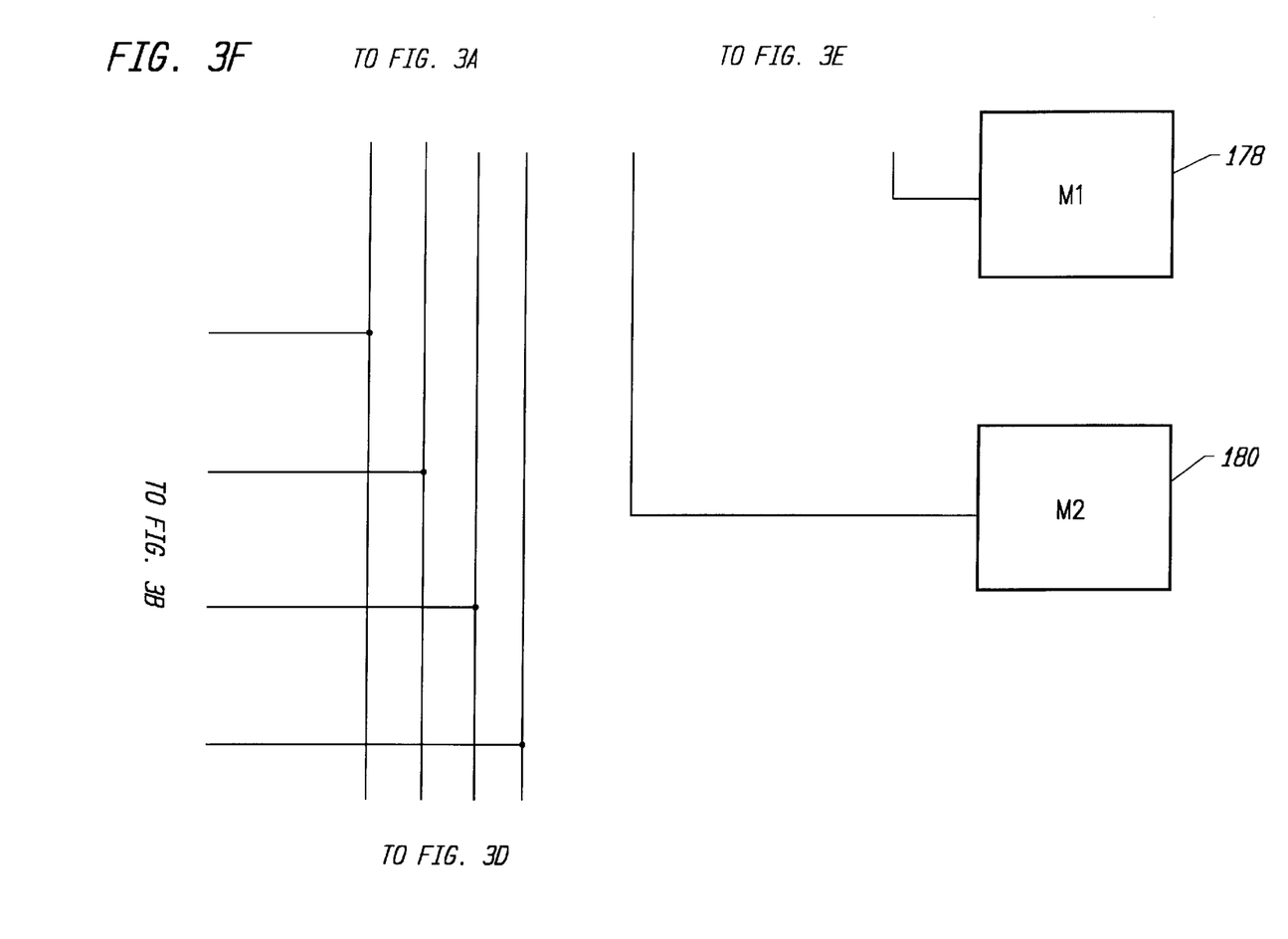
FIG. 3F is a fourth segment of the circuit diagram of FIG. 3A.
Figure 3G:
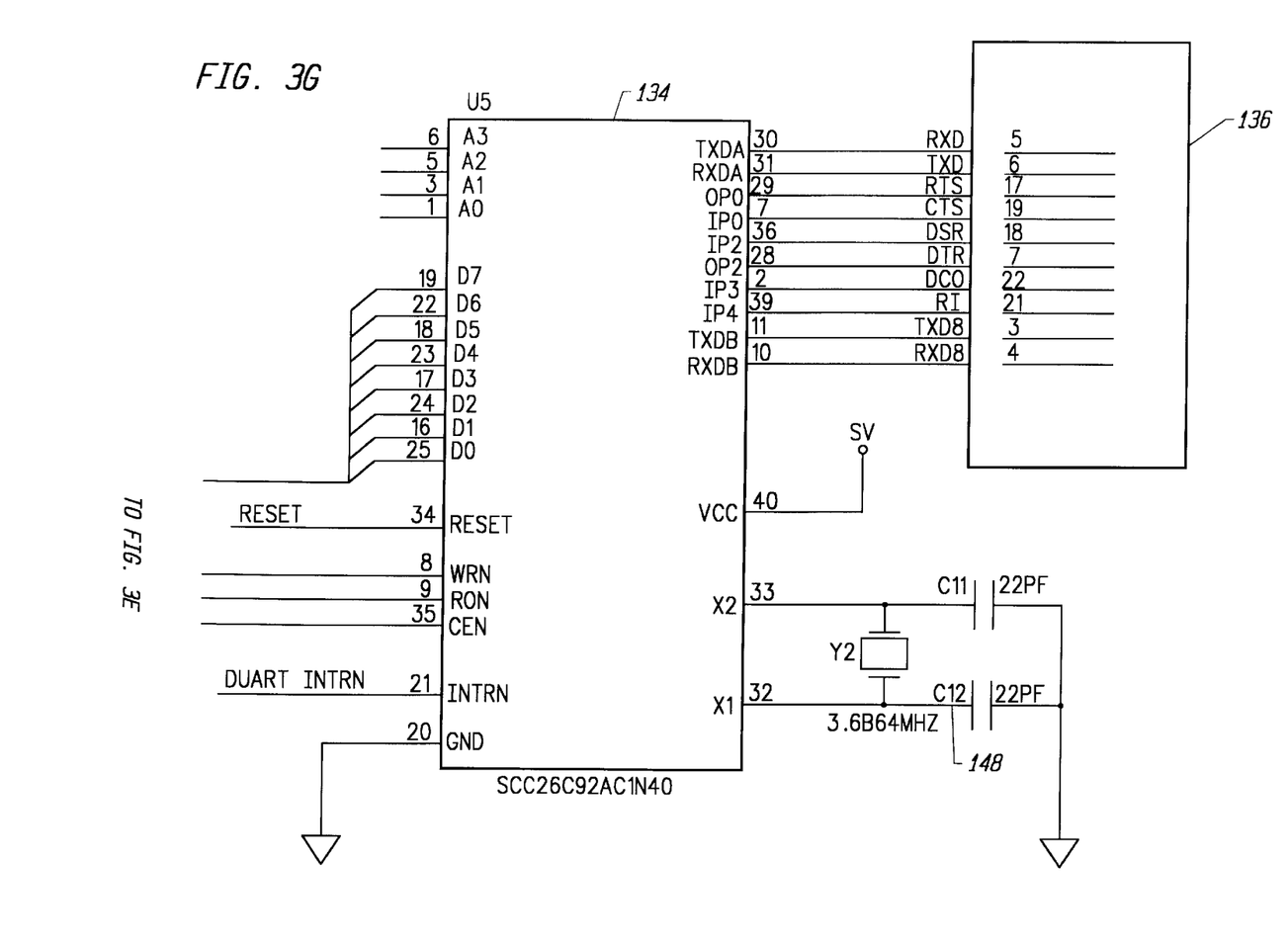
FIG. 3G is a fourth segment of the circuit diagram of FIG. 3A.

The interlink receiver unit 14 is designed for operation at different levels of security, depending on the requirements of the organization programming the phone units. The following sequence of operation is designed to provide moderate security. Implementation of higher levels of security will be discussed in conjunction with the circuit diagram of FIG. 3 and the alternate embodiment of FIG. 4.

Figure 2A:
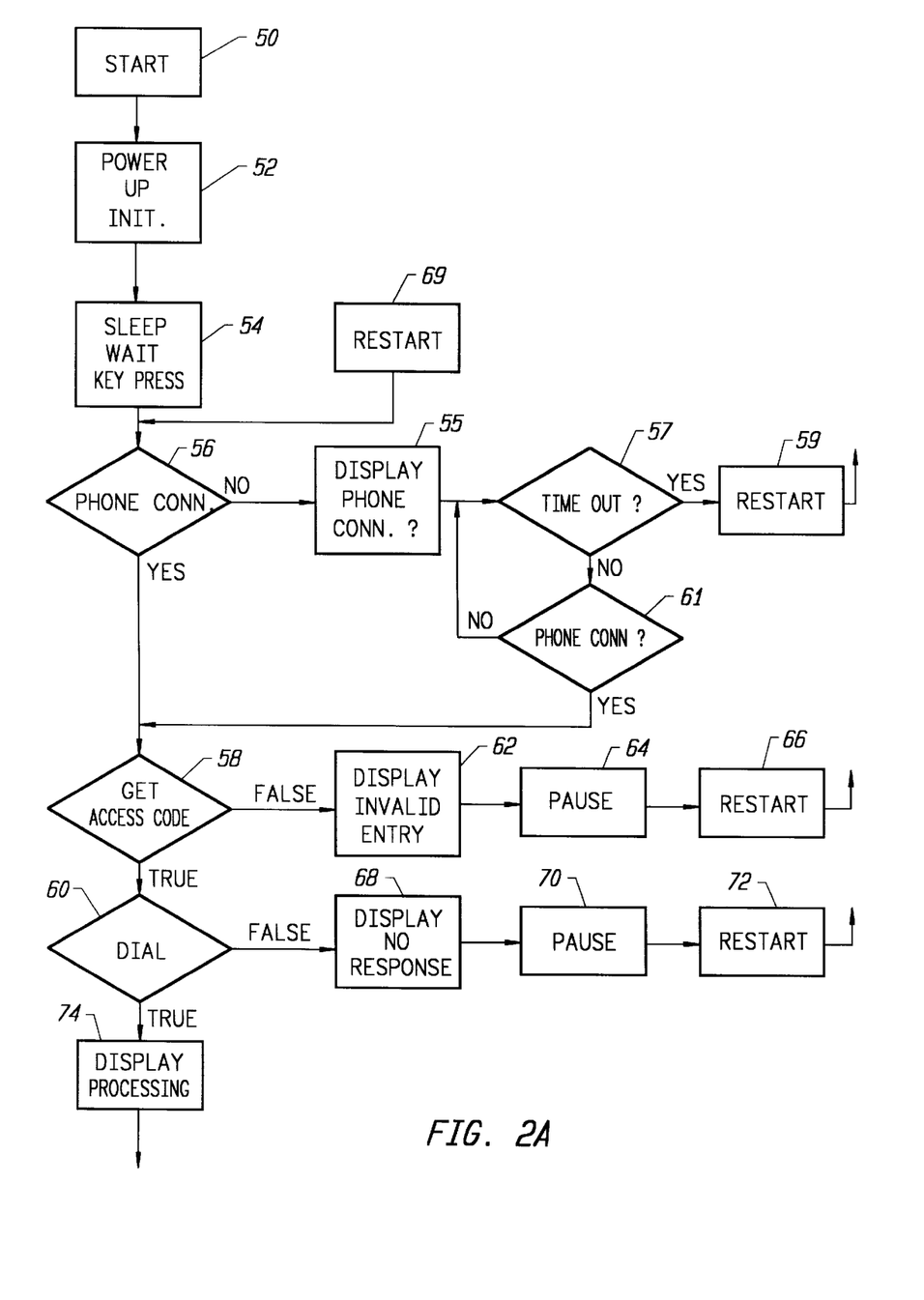
FIG. 2A is a diagrammatic view of the first part of a flow chart for encoding a phone unit.

Referring now to FIG. 2A, a portion of a flow chart depicting the mode of operation of the interlink receiver system 10 is shown. The host computer 12 has a computer program for controlling the encoding operation with the interlink receiver unit 14. The interlink receiver unit has at least an input and output electronics operable with a small microprocessor for exchanging data with the host computer and executing the encoding commands of the host computer 12. In the alternate embodiment of FIG. 4, the interlink receiver unit includes a computer program for programming and encoding a connected wireless phone unit under a reduced command set from the host computer 12.

From an initial start box 50, the interlink receiver unit 14 is turned on with power switch 48 and the unit is powered up in sequence box 52. The sequence from power up box 52 proceeds to a sleep mode at box 54 where the interlink receiver unit 14 awaits activity in the form of any key press to prompt the device into activity. When prompted, the device proceeds to decision diamond 56. If the phone unit 18 is not electronically connected via the data bus cable 41 to the receiver unit 14, the display screen is prompted at box 55 to display "PHONE CONNECTED?". The sequence proceeds to decision diamond 57, where a "TIME OUT?" prompt is displayed. If the response is yes, the sequence moves to restart box 59 which loops to initiation box 69. If no, the sequence proceeds to decision diamond 61 to determine if a phone unit is not connected. If yes, the sequence proceeds to diamond 58. If no, the sequence loops back to diamond 57. If the receiver unit is connected, the system proceeds to obtain the access code of the user of the interlink receiver unit 14 before proceeding. The procedure requires that a user authorization code be entered via the keyboard to insure that only authorized personnel are using the interlink receiver unit 14. When the correct access code is entered, the interlink receiver unit 14 dials the host computer 12 at diamond 60. When an invalid access code is entered, the LCD displays, "INVALID ENTRY" at box 62 and proceeds to a pause at box 64 allowing reentry of a proper access code before shut down at box 66 that loops to restart box 69 for reinitiation of the procedure. If after dialing at diamond box 60 with the prompt "DIALING" displayed, no connection is made, the display screen displays "NO RESPONSE" at box 68, pauses at box 70 and initiates a restart at box 72 that loops back to reinitiation box 69. If the dialing is successful and a connect is made, the interlink receiver unit 14 displays "PROCESSING" at box 74 and proceeds to the connect box 76 in FIG. 2B.

Figure 2B:
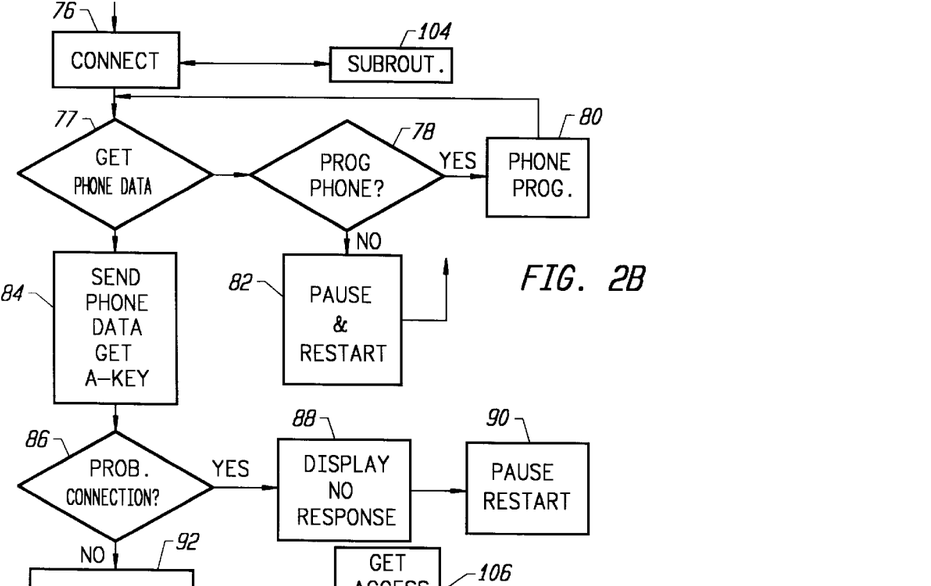
FIG. 2B is a diagrammatic view of the last part of the flow chart of FIG. 2A.

From the processing box 74 after connection of the interlink receiver unit 14 with the host computer 12, the interlink receiver unit 14 communicates with the phone unit 32 to obtain the access codes from the interlink receiver unit 14 and the phone data from the phone unit 18 in diamond 77. The access authentication sub-routine is discussed with relation to FIG. 2C hereinafter.

If the phone unit 12 responds with inadequate data, the dialogue box 78 inquires whether the phone unit is to be programmed and this message is displayed in the display screen 40. Ordinarily, the phone unit has been preprogrammed with at least the electronic serial number (ESN) and only the mobile identification number, and in certain instances the site identification number (SID) needs to be added to the phone unit. This is handled in a sub-routine box 80 where the number assignment module (NAM) is activated and the phone unit 18 is programmed by the host computer 12 or by the interlink receiver unit as discussed with relation to FIG. 4. The programming is accomplished in the same manner as described in the reference specifications. If the response is "NO", then the decision diamond 78 leads to the restart box 82 which disconnects the communication line with the host computer and loops to initiation box 69. If the phone unit 42 has both an ESN and a MIN, initially or after programming, the phone data, including at least the ESN and MIN, is sent to the host computer at box 84. The host computer returns the A-key and checks the communication circuit at diamond 86. It is to be understood that the A-key transmitted is transmitted in encrypted form, or, alternately as described hereinafter is a coded command to the interlink receiver as described with reference to FIG. 4 to generate the A-key from secret data shared by the host computer and by the interlink receiver on fabrication or servicing.

If there is a problem with the connection, the display screen 40 reads "NO RESPONSE", and after a pause the interlink receiver unit sequences to restart at box 90 which loops to box 69. If there is no problem with the connection, the process proceeds to displaying "PROCESSING" at box 92 as the code for the A-key or for generating the A-key is transferred to the security module in the phone 18. It is to be understood that certain phone manufactures will prefer to internally generate the A-key from an encryption chip or circuit within the phone unit. In these instances, the activation command together with any code data is passed to the phone unit 18 for internal generation of the A-key.

During the procedure of processing, the display message "PROCESSING" at box 94 is displayed. Once the A-key is programmed into the phone, the interlink receiver unit 14 displays the message "A-KEY PROGRAMMED" at box 98. Unless further tasks need to be accomplished, the system pauses at box 100 and enters restart mode at box 102 that loops the sequence back to box 69.

Figure 2C:
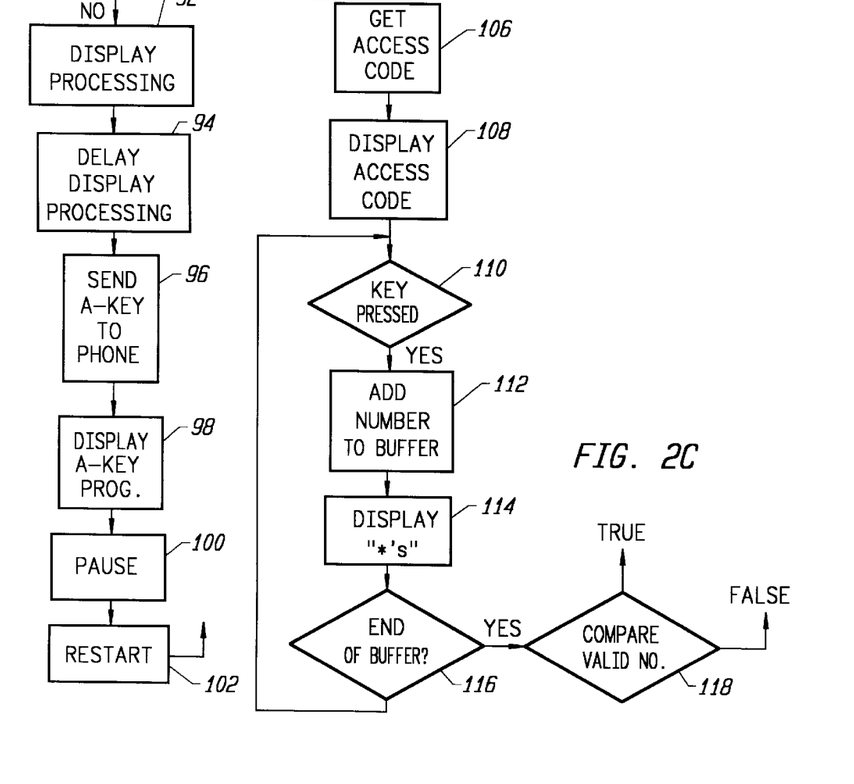
FIG. 2C is a diagrammatic view of a flow chart for a sub-routine for the flow chart of FIGS. 2A and 2B.

When the interlink receiver 14 connects to the host computer 12 at box 76, the sub-routine at box 104 is simultaneously initiated to authenticate both the interlink receiver unit 12 and the user. Referring to FIG. 2C, the sub-routine 104 includes a command to get access code at box 106 that prompts the interlink receiver unit 14 to display "ACCESS CODE?" at box 108 and awaits entry of the access code at diamond 110. As the user enters his or her access code, the numbers are added to a buffer 112 and the display screen is prompted to display a series of stars until the routine loops through enough entries to fill the buffer indicated at diamond 116 whereupon the access code number is compared to a stored number and access is granted to denied at decision tree 118. The same sub-routine is followed at decision diamond 58. Concurrently at box 106, the authentication code for the interlink receiver unit 12 is automatically transferred in encrypted form to the host computer to authenticate that a legitimate interlink receiver unit 12 is being connected to the host computer for exchange of coded data.

Referring now to FIG. 3, the minimum circuitry required for operating the interlink receiver unit 12 is shown in diagrammatic form. A small microprocessor 130 controls the operations within the interlink receiver unit 14 and connects to a latch chip 132 and a Duart dual serial port chip 134 for connection to the internal modem 136 and the phone unit 18. The microprocessor chip 130 is also connected to the keypad 138 via selector 140 and to LCD 142. The circuit includes the necessary power circuit 144 and clock circuit 146 and 148 for coordinating operations for both the connected mobile phone unit 18 and modem 136 that connects the interlink receiver unit 14 to the host computer 12. In this configuration, the interlink receiver operates as a controller and allows most of the programming functions to be initiated by the host computer 12 in communication with the phone unit 18.

Figure 4:
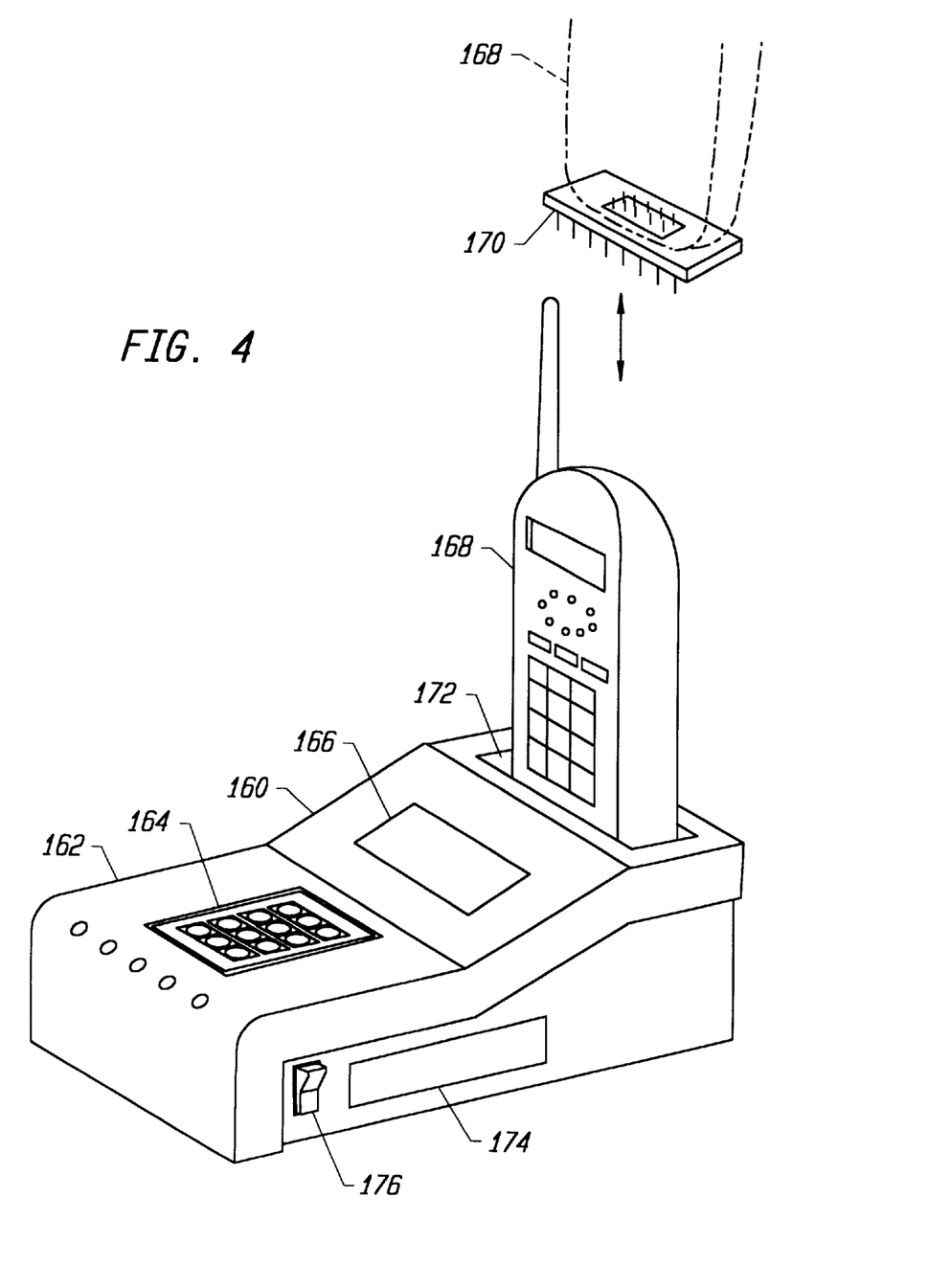
FIG. 4 is an alternate embodiment of the interlink receiver unit with a connected phone unit, the phone unit also shown in part, in phantom, detached from the interlink receiver unit.

Referring now to FIG. 4, an alternate embodiment of the interlink receiver unit is shown. The interlink receiver unit is designated generally by the reference numeral 160 and is constructed in a similar manner to that shown in FIG. 1. A housing 162 includes a keyboard 164 and an LCD 166. A wireless phone unit 168 is coupled to an adapter connector 170 for connecting the data port of the phone unit with the standard 25 pin receptacle (not visible) of the interlink receiver unit 16 which is mounted at the bottom of a well 172. This eliminates a cable connection between the interlink receiver 160 and the phone unit 168 for added security. By this direct connection, which can be shielded in the well 172, interception of the communication between the interlink receiver and the phone unit is minimized. Additionally, impedance sensitive detection circuitry and protective measures can be taken in the circuitry of the interlink receiver unit 160 or in the routing circuitry of the adapter connector 170, to maximize security. The adaptor connector 170 is constructed in a variety of configurations to couple the unique programming terminal of a particular phone unit with the pin receptacle of the interlink receiver unit.

The interlink receiver 160 is designed as an independent unit and includes its own internal battery power pack 174 that slides in adjacent the power switch 176 on the side of the housing 162. Internally, the interlink receiver unit 160 is similar to the unit of FIG. 1 with the addition of a replaceable read only memory 178 and a random access memory 180 connected to the microprocessor 130. The microprocessor 130 is required to be slightly more powerful than used for the interlink receiver unit 14 of FIG. 1 to handle the programming and memory functions described, and may be similar to the microprocessors used in programmable phone units. The random access memory 180 stores the necessary programming for programming phones and operationally assigning the A-key to the phone unit when prompted by the host computer. The read only memory 178 is in the form of a sealed, replaceable chip that stores a series of A-keys or part of the code necessary to generate the keys.

With the phone unit 168 plugged into the interlink receiver unit, the interlink receiver unit can activate the phone unit 18 using the ESN and communicate with the carrier through the radio electronics of the phone unit. The host computer 12 connects to a wireless communication service provider to communicate with the interlink receiver unit 160 over the airways. Although messages can be encrypted as described with relation to the embodiment of FIG. 1, it is common knowledge that the transmitted data can be intercepted and analyzed for cracking of encoded messages. The use of a destructible and replaceable ROM chip 178 enables data codes known to the host computer to be directly stored in inalterable form in the interlink receiver unit 160. This enables communications between the interlink receiver unit 160 via the mobile phone unit 168 to be accomplished in reduced instruction sets that are indecipherable, although widely distributed over the airways. For example, using simple coded command sets the host computer 12 can command the activation of programming of the security codes for the phone unit 18, using the programming software residing in the RAM 180 and codes residing in the ROM 178. The A-key can be coded into the phone unit using commands from the host computer 12 together with a completion piece of the A-key from the host computer 12 that is coupled with an indexed piece of the A-key stored in the ROM of the interlink receiver unit 160. In this manner, the host computer 12 never transmits more than a part of the data code for the A-key to the interlink receiver unit 160, and the interlink receiver unit never has more than a part of the data code for the A-key, unless actively entering the combined pieces of the completed A-key. As only the host computer 12 knows the entire code, loss of the interlink receiver unit 160 will not jeopardize the security of the data exchange or result in a loss of a series of A-keys. Exhausting the available data codes available for generating A-keys will require the interlink receiver unit to be returned to an authorized service center for replacement of the secure ROM chip with a new chip. Alternately, the ROM chip may include an algorithm for generating an A-key known to the host computer under command from the host computer 12. In each case, insufficient data is exchanged between the host computer 12 and the interlink receiver unit 160 to derive the A-key, even if the communications are deciphered.

It is therefore apparent that while greater control over security may be apparent in systems that communicate via hardwire, there are certain regions where there is no infrastructure to enable phone programming and encoding to be accomplished remotely except through airway communications. In such situations, so long as the carrier has reasonable control over the use of the interlink receiver, programming, encoding and activation of phones remotely over the airways can be accomplished expeditiously and securely.

By removing the programming and number assignment functions from a personal computer and installing them in dedicated hardware, opportunity for user intrusion is minimized by restricting the data to which the user has access. Additionally, the use of dedicated hardware enables security measures to be implemented in the hardware and circuitry of the dedicated hardware which would be impossible to implement in the open architecture of a personal computer. The interlink receiver unit is effectively designed as a tamper-proof unit that requires the cooperation of the host computer to unlock the data used for programming and encoding phone units. Additionally, while code data in the interlink receiver is secret shared data with the host computer, the host computer is not obliged to share its secret data with the interlink receiver except on an item by item basis when encoding a particular phone unit. The host computer 12 can therefore maintain its security independent of the loss or compromise of the security of the interlink receiver unit.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An interlink receiver system for encoding wireless phone units with security codes comprising:
   a host computer;
   an interlink receiver unit remote from the host computer having communication means secure from a user of the interlink receiver system for communicating with the host computer, wherein the host computer has communication means for communicating with the interlink receiver unit, and a computer program for effecting the exchange of data between the host computer and the interlink receiver unit wherein the interlink receiver unit has a secure memory with stored security code data including an authentication code identifying the interlink receiver unit;

an interconnection terminal connected to the interlink receiver unit and electronically connectable to a wireless phone unit to be encoded; and, authentication means in the interlink receiver unit that authenticates the interlink receiver unit using the stored authentication code of the interlink receiver unit before encoding the connected wireless phone unit, and, cooperative authentication means in the host computer secure from a user of the interlink receiver unit for authenticating the interlink receiver unit and authorizing exchange of data between the host computer and the interlink receiver unit, and the connected wireless phone unit.

2. The interlink receiver system of claim 1 wherein the communication means of the host computer is a modem connectable to conventional telephone lines and the communication means of the interlink receiver unit is a modem connectable to conventional telephone lines.

3. The interlink receiver system of claim 1 wherein the communication means of the interlink receiver unit is a wireless communication means.

4. The interlink receiver system of claim 3 wherein the wireless communication means is the wireless phone unit connected to the interlink receiver unit, wherein communication with the host computer is through the wireless phone unit to a wireless communication service provider.

5. The interlink receiver system of claim 4 wherein the communication means of the host computer is a modem and the modem is connected to a conventional telephone line in communication with the wireless communication service provider.

6. The interlink receiver system of claim 1 wherein the host computer has data in the form of security codes and program means for transferring data in the form of at least one security code to the wireless phone unit when the interlink receiver unity is in communication with the host computer and the wireless phone unit is connected to the interlink receiver unity by the interconnection terminal.

7. The interlink receiver system of claim 6 wherein the interlink receiver unit has connection means for initiating the connection of the interlink receiver unit with the host computer when the wireless phone unit is connected to the interlink receiver unit.

8. The interlink receiver system of claim 7 wherein the cooperative authentication means in the host computer and in the interlink receiver unit has software means for authenticating the interlink receiver unit and selectively authorizing access to the host computer by entry of an access code in the interlink receiver unit.

9. The interlink receiver system of claim 8 wherein the interlink receiver unit has a keyboard for data entry including entry of an access code.

10. The interlink receiver system of claim 9 wherein the interlink receiver unit includes a display means for display of messages and display of data entered by the user entering data on the keyboard.

11. The interlink receiver system of claim 1 wherein the secure memory of the interlink receiver unit includes code means for generating a secret authentication key in the wireless phone unit connected to the interlink receiver unit.

12. The interlink receiver system of claim 11 wherein the secure memory of the interlink receiver unit comprises a pre-programmed ROM chip.

13. The interlink receiver system of claim 1 wherein the secure memory of the interlink receiver unit includes storage of a series of secret authentication keys wherein the mobile phone unit connected to the interlink receiver unit is programmed with one of the secret authentication keys in the series.

14. The interlink receiver system of claim 1 wherein the secure memory of the interlink receiver unit includes storage of a series of secret partial authentication keys and the host computer includes storage of a series of secret partial authentication keys combinable with a selected one of the partial authentication keys stored in the secure memory of the interlink receiver unit, wherein the mobile phone unit connected to the interlink receiver unit is programmed with a secret authentication key generated in part from one of the secret partial authentication keys of the secret host computer and one of the partial authentication keys of the interlink receiver unit.

15. An interlink receiver unit for entering security codes in wireless phone units under control of a remote host computer, the interlink receiver unit comprising:

a housing having data entry means and data display means;

internal electronic control circuitry means contained within the housing and secure from a user of the interlink receiver unit for controlling the operation of the interlink receiver unit;

a protected memory chip in the internal electronic control circuitry means with stored security code data secure from a user of the interlink receiver unit wherein the stored security code data includes data to identify and authenticate the interlink receiver unit;

communication means operable by the control circuitry for exchanging data between the interlink receiver unit and the host computer;

communication means operable by the control circuitry for exchanging data between the interlink receiver unit and a wireless phone unit electronically connected with the interlink receiver unit after authentication of the interlink receiver unit by the host computer; and data transfer means for transferring security code data to the wireless phone unit in communication with the interlink receiver unit on command by the host computer.

16. The interlink receiver unit of claim 15 wherein the communication means of the interlink receiver unit is a modem and the modem has a terminal connector connectable with a telephone line wherein the interlink receiver unit communicates with the host computer through conventional telephone lines.

17. The interlink receiver unit of claim 15 wherein the interlink receiver unit has security means for limiting access to the interlink receiver unit.

18. The interlink receiver unit of claim 16 wherein the host computer transfers security code data through the interlink receiver unit to the wireless phone unit electronically connected with the interlink receiver unit.

19. The interlink receiver unit of claim 15 wherein stored security code data in the memory of the interlink receiver unit is transferred to the wireless phone unit electronically connected with the interlink receiver unit on command by the host computer.

20. The interlink receiver unit of claim 15 wherein the interlink receiver unit has an authentication code that authenticates the interlink receiver unit, and the host computer communicates with the interlink receiver unit and has program means for authenticating the interlink receiver unit and exchanging security code data with the interlink receiver unit and connected phone unit only after authenticating the interlink receiver unit.

21. The interlink receiver unit of claim 15 wherein the communication means between the interlink receiver unit and the wireless phone unit is a connector terminal electronically connecting the interlink receiver unit with the wireless phone unit.

22. The interlink receiver unit of claim 15 wherein the communication means between the interlink receiver unit and the host computer is a wireless communication means.

23. The interlink receiver unit of claim 22 wherein the wireless communication means includes the wireless phone unit electronically connected to the internal electronic control circuitry of the interlink receiver unit.

24. The interlink receiver unit of claim 15 wherein the internal electronic control circuitry includes a microprocessor and a protected memory and the interlink receiver unity includes a program for programming the wireless phone unit connected to the interlink receiver unit with security code data from the protected memory on command by the host computer.

25. The interlink receiver unit of claim 15 wherein the protected memory chip of the interlink receiver unit includes code means for generating a secret authentication key in the wireless phone unit connected to the interlink receiver unit.

26. The interlink receiver unit of claim 25 wherein the protected memory chip of the interlink receiver unit comprises a pre-programmed ROM chip.

27. The interlink receiver unit of claim 15 wherein the protected memory chip of the interlink receiver unit includes storage of a series of secret authentication keys wherein the mobile phone unit connected to the interlink receiver unit if programmed with one of the secret authentication keys in the series.

28. The interlink receiver unit of claim 15 wherein the protected memory chip of the interlink receiver unit includes storage of a series of secret partial authentication keys and the host computer includes storage of a series of secret partial authentication keys combinable with a selected on of the partial authentication keys stored in the protected memory chip of the interlink receiver unit, wherein the mobile phone unit connected to the interlink receiver unit is programmed with a secret authentication key generated in part from one of the secret partial authentication keys of the secret host computer and one of the partial authentication keys of the interlink receiver unit.

* * * * *